May 30, 1967   H. MÜLLER   3,322,962
METHOD AND APPARATUS FOR CONTINUOUSLY MEASURING APPLIED
COATINGS EMPLOYING PHOTOELECTRIC MEANS
Filed Sept. 28, 1964
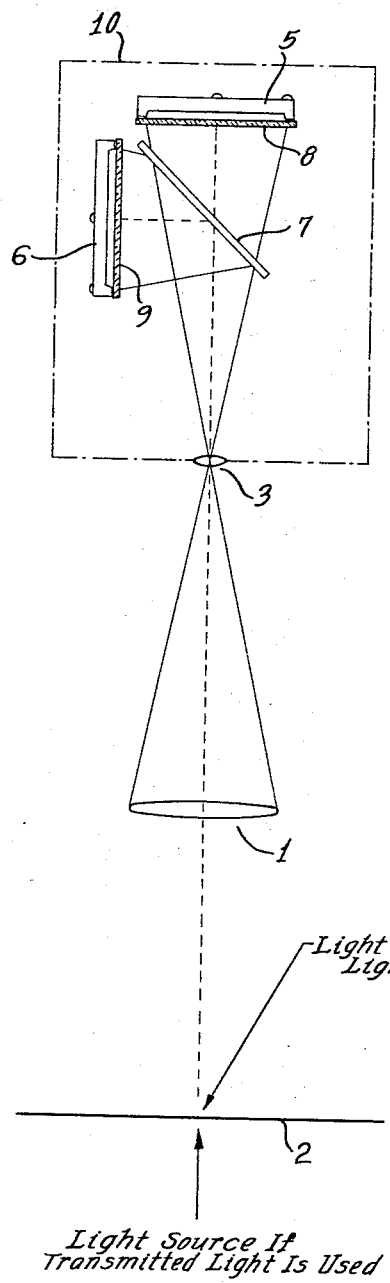
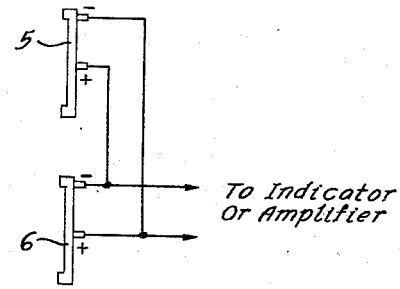
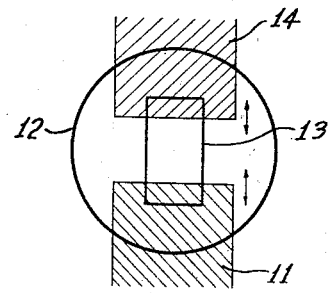
INVENTOR.
Herbert Müller
BY
James E. Bryan
ATTORNEY

United States Patent Office 3,322,962
Patented May 30, 1967

3,322,962
METHOD AND APPARATUS FOR CONTINUOUSLY MEASURING APPLIED COATINGS EMPLOYING PHOTOELECTRIC MEANS
Herbert Müller, Wiesbaden, Germany, assignor to Kalle Aktiengesellschaft, Wiesbaden-Biebrich, Germany
Filed Sept. 28, 1964, Ser. No. 399,458
Claims priority, application Germany, Oct. 1, 1963, K 50,961
9 Claims. (Cl. 250—219)

The present invention provides a method of and apparatus for continuously measuring the quantity of substances applied as a coating on a carrier web.

For optically measuring coatings in the laboratory there are available a number of optical measuring methods and measuring instruments, by means of which the quantities of coating ingredients, or their deviation from a required value can be measured by transmitted or reflected light. The coatings are in practice almost always produced on papers, films, foils, textile materials or other flat materials in web form.

Measuring instruments of this kind can not, in general, be mounted on operating machines or employed in a production plant without considerable expense because in such cases the accuracy of measurement is adversely affected by vibration and temperature fluctuations. However, since in many cases for reasons of uniform production a continuous check is required at the machine itself, which in most cases deposits a very thin coat continuously and automatically on a carrier web, it is an outstanding requirement to provide a measuring apparatus which functions very accurately, automatically and continuously under the aforementioned difficult conditions.

The present invention provides a method of continuous measurement of the amount of deposition on a carrier web of a substance having an electromagnetic absorption different from that of the web, wherein the web coated with the substance is subjected to the impingement of electromagnetic radiation, transmitted or reflected rays are divided, one fraction is received on a photoelectric receiver responsive to radiation of the nature of that absorbed by the substance and another fraction is received on a photoelectric receiver responsive to residual radiation; the difference in the generated photocurrents is used as an indication of the deposition. Preferably, the transmitted or reflected rays are passed through converging means before division.

The invention also provides an apparatus for use in the method described above, the apparatus including a source of electromagnetic radiation, means for dividing the transmitted or reflected rays, two photoelectric receivers as specified and, in circuit therewith, means for indicating the difference in the generated photocurrents. Preferably, each receiver includes filter means for a different one of the absorbed and residual radiations.

The invention offers an advantageous way of obtaining continuous and accurate measurements of the amounts of coatings deposited, for example by coating machines, even under difficult working conditions, as when the floor vibrates or the temperature fluctuates, without requiring much attention. Between the measuring instrument and the web of material to be tested there remains sufficient space for the machine operator to work, for example for inserting a new web. It is an advantageous feature that the unavoidable variations in the thickness of the carrier web, e.g. the paper or the film, do not adversely affect the accuracy of measurement of the coating.

Moreover, the apparatus of this invention incorporates no rotating or otherwise movable parts so that a superior safety in operation and a reduced tendency to develop defects are ensured. Furthermore, the apparatus is so compact that it can be located in practically any position suitable for measurement without interfering with the smooth progress of the production run.

Especially advantageous is the operational reliability of the apparatus of this invention which indicates accurate measurements over long periods, without using voltage regulators or requiring intermittent readjustment.

One embodiment of the apparatus of the invention is diagrammatically illustrated in the accompany drawings in which:

FIGURE 1 is a view in elevation of the apparatus,
FIGURE 2 shows part of a circuit diagram, and
FIGURE 3 shows a detail of the apparatus.

The apparatus illustrated functions on the principle of optical compensation; the intensity of a beam of rays that is very weakly absorbed by the material under test is compared with the intensity of a beam of rays which, owing to the color of the coating to be measured, is subject to a stronger absorption. The possible wave range can include not only visible light but also ultraviolet and infrared light. When reflected light is used for measurement, the measuring station may be backed with a white or color standard whose remission for the reference wavelength corresponds with that which would be associated with very many layers or very thick pieces of the material under test.

As radiation generators there are used, for example, gas discharge lamps which give rise to spectral lines of adequate intensity at least in the region that is weakly absorbed by the test web to be measured (hereinafter called wave region I) and in the region that is strongly absorbed by the test web (hereinafter called wave region II).

Referring to the drawing (FIG. 1), an objective 1 (which is at an appropriate distance from a test web 2 to be measured to receive a sufficient amount of light) receives scattered light reflected from or transmitted by the test web, and in conjunction with a further optical element 3 (for example a converging lens or a concave mirror) produces images on the photoelectric elements 5 and 6. In the path of the rays between the element 3 and the photoelectric cells 5 and 6 there is positioned a device 7 for dividing the light, e.g. a partly silvered mirror whose transmission is adjusted to the intensities of the region I and region II radiation, so that it may divide the entire radiation into two beams of equal spectral composition, the relative intensities of which are of an order such that after eliminating the non-desired region from each beam, respectively, by filtering there are obtained region I and region II radiations of an equal order of magnitude. It may be replaced by a mirror which is translucent to or reflects only certain wavelength regions, for example a so-called cold-light mirror, or by a reflecting filter, or by the mirrored side of an interference line or band filter. In front of the photoelectric cells 5 and 6 there are color filters or spectral line filters 8 and 9, respectively. These filters are interchangeable for other filters when other colors are to be measured. When mirrors or interference filters are used which pass and/or reflect only certain wavelength regions, one or even both color filters in front of the photoelectric elements can be dispensed with. When the light in the two regions is sufficiently intense, the two optical systems mentioned above can be omitted, e.g. when nonscattering films are to be measured by transmitted light. When the material mentioned is exposed to parallel transmitted light, the light division referred to can be carried out without an additional optical device in front of the photoelectric elements. Thus, in each case the wave region I and the wave region II are divided immediately in front of the photoelectric cells so that they always emanate from the same areas of the test web.

The two photoelectric elements 5 and 6 are located close together in a thermoinsulated housing 10 which, if required, can be cooled or maintained at a specific constant temperature. They are connected relative to one another by known electrical methods so that only the current difference, i.e., the voltage difference or the ratio of their currents or voltages is registered. FIGURE 2 shows as an example a particularly simple wiring diagram for these photoelectric elements. At the desired value of the coating, the differential current or the differential voltage equals zero, or the ratio, of the currents or voltages equals unity. These currents or voltages are suitably amplified and then transmitted to an indicator device, e.g. a recording instrument, or used for controlling production by means of a suitable automatic unit.

The illumination of the test web by means of incident and reflected or by means of transmitted light can be performed by known optical methods with the aid of lenses, mirrors, diaphragms or the like, for which purpose it need only be ensured that a sufficient distance is maintained between the light source and the test web. The setting of the apparatus to the desired reference value is performed electrically by means of known devices, e.g. a potentiometer, by reducing the stronger photocurrent or the higher photovoltage.

Advantages may also be derived from a purely optical compensation, e.g. by rotary pairs of polarizing filters located in front of the photoelectric elements. According to another embodiment of the invention, a color filter 11 (FIG. 3) is used which is so selected that it passes very readily the light of one wavelength region—e.g. region II —but absorbs the light of the other wave length region. This color filter is interposed in the beam in front of a constantly illuminated diaphragm 12 in a manner such that it masks the diaphragm aperture 13 in a measurable manner. The diaphragm and the filter may be of any desired shape, provided they enable a finely graduated compensation. The measuring diaphragm described may be located either in the illuminating unit or in the measuring unit proper, provided the partial masking of the diaphragm aperture does not interfere with the even illumination of the two photoelectric elements. On the measuring side, for example, the objective 3 is a suitable location, provided it is ensured that this objective is uniformly illuminated. In actual practice, the desired value is preset by interposing the filter 11 in the beam at a position determined by independent calibration, while the second filter 14, is entirely outside the beam.

Since this two-filter arrangement makes it possible to set the apparatus for any desired intensity ratio between the light of region I and region II, any absolute setting can be made directly on the machine after a previous calibration. For this purpose, in the reflected light arrangement, there is arranged immediately above the web to be measured a white or color standard against which the calibration was previously made. When measuring with transmitted light, on the other hand, the setting is performed without test material against air or a color filter.

The constancy of the zero value over a prolonged period can be enhanced by using the current or voltage emitted by the electrical unit, after suitable amplification, for automatically resetting the above-described optical compensating device in the known manner so that the irradiation intensities (or the ratio thereof) of the photoelectric elements always remains constant. In such a case, the resetting of the compensating device can be transmitted, e.g. by an electrical signal generator, to a suitable measuring and recording device or to an automatic control means for the machine.

It will be obvious to those skilled in the art that many modifications may be made within the scope of the present invention without departing from the spirit thereof, and the invention includes all such modifications.

What is claimed is:

1. A method for the continuous measurement of the quantity of material deposited on a carrier web, the material having an electromagnetic absorption different from that of the web, which comprises impinging electromagnetic radiation having at least two spectral regions on the coated web, dividing the impinged rays, receiving one fraction of the rays on a photoelectric receiver responsive substantially only to radiation of the type absorbed by the material, receiving a second fraction of the rays on a photoelectric receiver responsive substantiallly only to residual radiation, and employing the difference in generated photocurrents of said receivers as a measurement of the quantity of material deposited.

2. A method according to claim 1 in which the impinged rays are converged before being divided.

3. A method according to claim 1 in which the impinged rays are transmitted through the coated web.

4. A method according to claim 1 in which the impinged rays are reflected from the coated web.

5. An apparatus for use in the continuous measurement of the quantity of material deposited on a carrier web which comprises means for impinging electromagnetic radiation having at least two spectral regions on the coated web, means for dividing the impinged rays, photoelectric receiver means responsive substantially only to radiation of the type absorbed by the material for receiving one fraction of the rays, photoelectric receiver means responsive substantially only to residual radiation for receiving a second fraction of the rays, means for measuring the difference in generated photocurrents, and means for indicating the difference in generated photocurrents.

6. An apparatus according to claim 5 including means for converging the impinged rays before they are divided.

7. An apparatus according to claim 5 in which the means for impinging electromagnetic radiation on the coated web is positioned on the opposite side of the web from the dividing means.

8. An apparatus according to claim 5 in which the means for impinging electromagnetic radiation on the coated web is positioned on the same side of the web as the dividing means.

9. An apparatus according to claim 5 in which each photoelectric receiver means include filter means.

References Cited

UNITED STATES PATENTS

| | | | |
|---|---|---|---|
| 2,215,211 | 9/1940 | Devol | 88—14 |
| 2,382,439 | 8/1945 | Osborn | 88—14 |
| 2,973,686 | 3/1961 | Dreyfus et al. | 88—14 |
| 3,017,512 | 1/1962 | Wolbert | 250—83.3 |

FOREIGN PATENTS 925,197    3/1955    Germany.

WALTER STOLWEIN, *Primary Examiner.*